Sept. 12, 1944.   F. H. BOGART   2,358,049
WORK GRIPPING DEVICE
Filed June 7, 1941   8 Sheets-Sheet 1

INVENTOR.
FRED H. BOGART
BY
Kwis Hudson & Kent
ATTORNEYS

Sept. 12, 1944.  F. H. BOGART  2,358,049
WORK GRIPPING DEVICE
Filed June 7, 1941  8 Sheets-Sheet 4

INVENTOR.
FRED H. BOGART
BY Kwis Hudson & Kent
ATTORNEYS

Sept. 12, 1944.　　　F. H. BOGART　　　2,358,049
WORK GRIPPING DEVICE
Filed June 7, 1941　　　8 Sheets-Sheet 5

INVENTOR.
FRED H. BOGART
BY
ATTORNEYS

Sept. 12, 1944.   F. H. BOGART   2,358,049
WORK GRIPPING DEVICE
Filed June 7, 1941   8 Sheets-Sheet 6

INVENTOR.
FRED H. BOGART
BY
ATTORNEYS

Sept. 12, 1944.     F. H. BOGART     2,358,049
WORK GRIPPING DEVICE Filed June 7, 1941     8 Sheets-Sheet 7

INVENTOR.
FRED H. BOGART
BY
    Kwis Hudson & Kent
    ATTORNEYS Sept. 12, 1944.　　　F. H. BOGART　　　2,358,049
WORK GRIPPING DEVICE
Filed June 7, 1941　　　8 Sheets-Sheet 8

INVENTOR.
FRED H. BOGART
BY Kwis Hudson & Kent
ATTORNEYS

Patented Sept. 12, 1944

2,358,049

UNITED STATES PATENT OFFICE 2,358,049

WORK GRIPPING DEVICE

Fred H. Bogart, University Heights, Ohio, assignor to The Warner & Swasey Company, Cleveland, Ohio, a corporation of Ohio Application June 7, 1941, Serial No. 397,145

7 Claims. (Cl. 279—114)

This invention relates to work gripping devices such as chucks for machine tools and has particular reference to mechanism for actuating the work gripping members such as movable work gripping jaws.

The principal object of the present invention is to provide a power-operated work gripping device wherein there is substantially a maximum increase in leverage between the power-driven actuating member and the part or parts which move the work gripping member or members to and from work gripping position.

A further object is to provide a power operated work gripping device which functions with maximum efficiency due to the increase in leverage between the power driven actuating member and the part or parts which move the work gripping member or members to and from work gripping position as well as due to the proper distribution of weight in the operative parts which eliminates vibration and distortion therein and also because of the simplicity of the design of the various parts of the device.

The above objects are attained very effectively by the chucks and particularly the mechanisms herein disclosed for operating the work gripping means.

In the accompanying sheets of drawings I have illustrated two forms of my improved work gripping device both embodied in chucks adapted particularly for use in connection with machine tools but it is to be understood that my invention in many of its aspects may be embodied in work gripping devices of other forms and for use on other types of machines.

Referring now to the drawings and first to Figs. 1 to 12, illustrating one form of my invention, the chuck body 20 is adapted to be secured in any suitable manner, as by bolts 21, to a rotary spindle 22 which may be the spindle of a machine tool, as, for example, a lathe. The chuck body, in this instance, is composed of two main portions including a front portion 23 and a rear portion 24 which may be secured together by the bolts 21 and, if desired, by additional bolts 25 and 25a one of each being shown in Fig. 3. The forward end of the spindle may have any suitable construction adapted to give a centralized mounting for the chuck body on the spindle. At the front of the forward portion 23 of the chuck body are a series of radially disposed guideways which receive work gripping jaws 26 of the reversible type. In this instance three movable jaws 26 are shown but the number of jaws may be greater or less than three and in some instances a single movable jaw may be employed in connection with a stationary jaw. In the claims, the expression "work gripping means" is intended to include one or more work gripping members of any appropriate type or form. These jaws 26 are adapted to be moved radially by an actuator in the form of a scroll 27 having the usual thread-engaging spiral grooves on the rear faces of the jaws in the well known manner. Obviously the rotation of the scroll moves the jaws in one direction or the other depending upon the direction in which the scroll is rotated.

Figure 9:
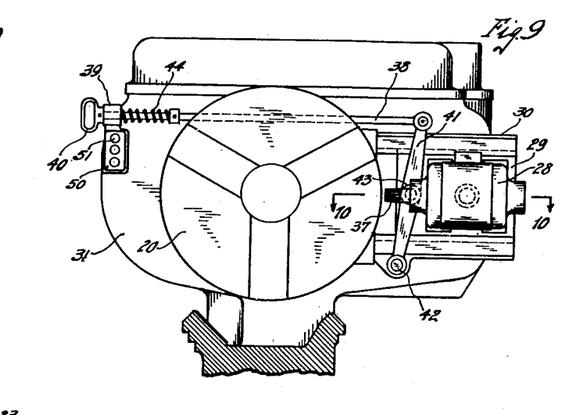
Fig. 9 is a view on a reduced scale showing a front view of the chuck, a portion of the machine tool to which the chuck is applied, and the actuating and operating mechanism for the chuck.
Figures 10, 11:
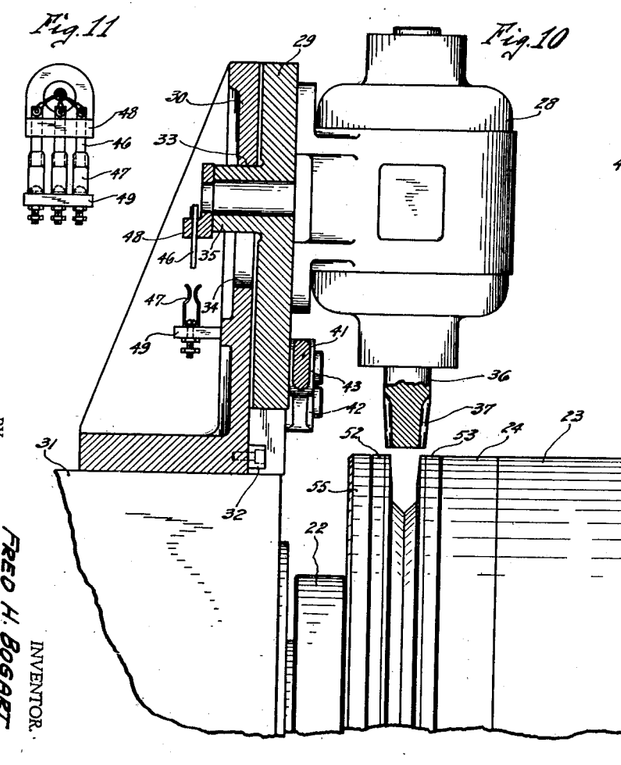
Fig. 10 is a plan view on an enlarged scale of the mechanism shown in Fig. 9 with the motor shown in elevation and the motor support in section substantially along the line 10—10 of Fig. 9.
Fig. 11 is a view looking toward the right of Fig. 10 showing the switch contacts in closed position instead of in open position as illustrated in Fig. 10.

The power mechanism for turning the scroll 27 and therefore for moving the jaws in and out, in this instance, includes an electric motor 28 which in the embodiment now being described is mounted externally of the chuck body. As best illustrated in Figs. 9 and 10, the motor is secured to a slide 29 which is mounted for reciprocating or rectilinear movement back and forth toward and away from the chuck. As herein illustrated, this slide 29 is mounted in the guideway of a bracket 30 which is secured to a suitable support, in this instance the headstock 31 in which the spindle 22 is rotatably mounted. The movement of the slide 29 toward the chuck may be limited by any suitable stop member, such as a block 32, secured to the bracket 30 as illustrated in Fig. 10 and its outward movement may be limited by any suitable stop member carried by or forming a part of the bracket, in this instance including a shoulder 33 at the outer end of a slot 34 formed in the bracket to receive and to provide clearance for a boss 35 carried by the slide 29.

The motor has a shaft 36 and the portion of the shaft which is toward the chuck body projects beyond the motor housing and at its free end is formed into a bevel pinion 37 which is adapted to slide into meshing engagement with two bevel gears which are carried by the chuck body and are to be referred to presently.

As best illustrated in Fig. 9, the motor and the slide are moved toward and from operative position by a rod 38 which may be supported on the headstock 31 and projects through a bracket 39 at the front of the headstock. The forward end of the rod 38 is provided with a suitable handle 40 and the rear end of the rod is pivotally connected to the upper end of a lever 41 whose lower end is pivotally supported at 42 on a suitable portion of the bracket 30. At an intermediate point designated 43 the lever is pivotally connected to the slide 29 so that the forward motion of the rod 38 will rock the lever and shift the slide and motor forwardly so as to cause the pinion 37 to move into operative relation with the bevel gears which it is adapted to rotate, and when the slide 29 abuts the stop block 32, the forward movement of the rod 38 is stopped at a point such that the pinion 37 is then in proper meshing relation with the gears. A spring 44 surrounding a portion of the rod is compressed when the rod is moved forwardly and when the operator releases his hold on the handle portion 40 of the rod 38, this spring restores the slide, the motor, and the rod 38 to their former inoperative positions.

Figure 12:
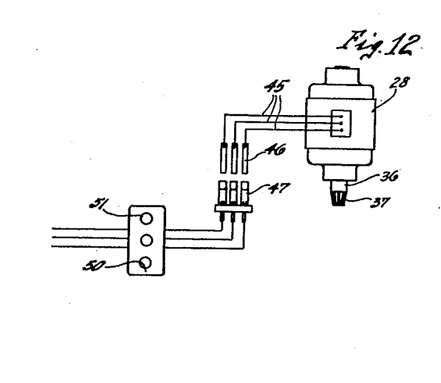
Fig. 12 is a diagrammatic view showing in simplified manner the wiring for the motor which operates the chuck.
Figure 13:
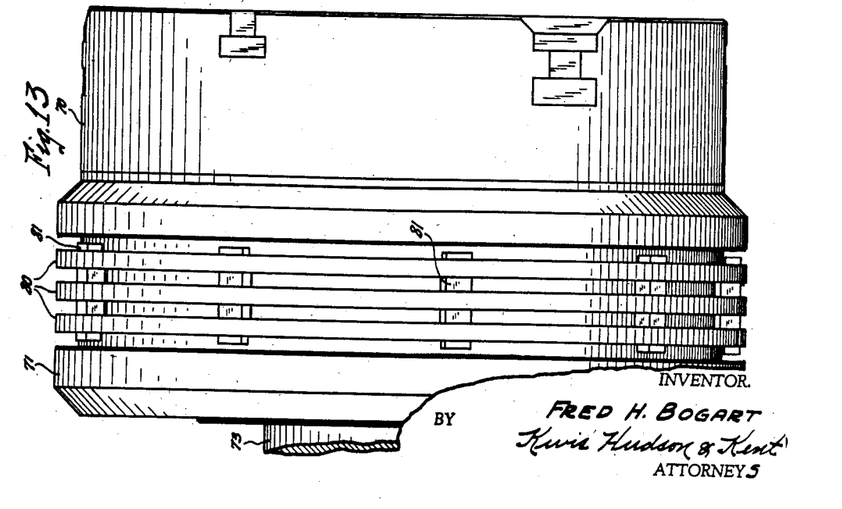
Fig. 13 is an elevational view similar to Fig. 1 but showing a modification.
Figure 14:
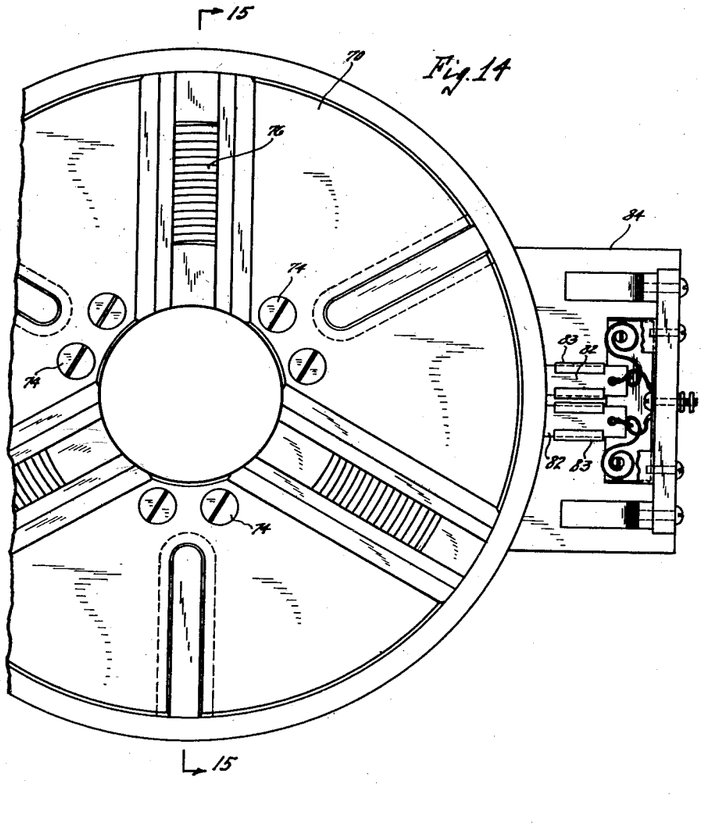
Fig. 14 is a front elevation of the modified construction.

As illustrated in Fig. 12, the motor is supplied with current by conductors 45 which are here shown as three in number and which may constitute the conductors of a three-phase supply circuit. For the control of the motor circuit I utilize in addition to the switches to be referred to presently three movable contacts 46 and three stationary contacts 47, the former being connected to the terminals of the motor and the latter to the supply conductors proper. The contacts 46 are mounted on an insulating member 48 secured to the end of the boss 35 while the contacts 47 are secured to an insulating member 49 secured to the bracket 30. When the motor is retracted or is in its normal inoperative position, the contacts 46 are separated from the contacts 47, but when the motor is slid to its operative position, the contacts 46 engage the contacts 47 as in Fig. 11.

To start and stop the motor I have here shown in simplified manner a switch 50 which may have three push buttons 51, one for starting the motor for rotation in one direction, another for starting the motor for rotation in the opposite direction, and the third, in this instance the intermediate button, for stopping the motor whether rotating in the forward or the reverse direction. I might here state that the actual switch mechanism will usually include numerous switches including a reversing or so-called "direction" switch, solenoid operated switches, and other switches.

In both forms of my invention herein illustrated, alternating current motors of the induction type are employed but any type of motor may be utilized. The motor may be of the stalling type, but in many instances, as when the chuck is for general application, that is, is adapted for work pieces of various types and strengths requiring light, medium or heavy jaw pressures thereon, depending upon the nature of the work piece, it is desirable that provision be made for causing the work gripping means to grip the work piece with a predetermined but variable degree of pressure. Accordingly, in accordance with an important feature of my invention later to be described, I provide a control for the motor embodying a control unit by which the motor circuit is automatically opened and the motor is stopped when the work gripping means engages the work piece with a predetermined but variable pressure.

At this point it might be stated that, in the use of a chuck such as contemplated by the present invention, in one instance the jaws may move radially inward to grip the work externally while in another instance the jaws may move radially outward to grip the work internally. In other words, the scroll will be moved in one or the other direction for causing the jaws to grip the work and will move in one or the other direction for moving the jaws to release the work, depending upon whether there is external or internal gripping. Accordingly, whether one of the buttons for starting the motor in one direction or the other button for starting the motor in the reverse direction is employed in any one instance will depend upon whether the work is to be gripped externally or internally.

Figure 7:
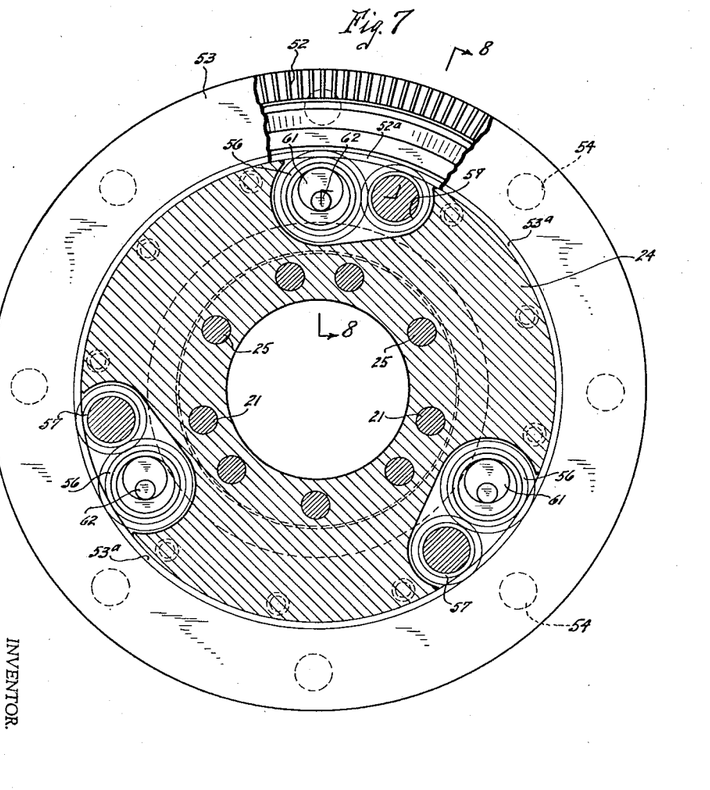
Fig. 7 is a transverse sectional view substantially along the line 7—7 of Fig. 3 with a portion broken away.
Figure 8:
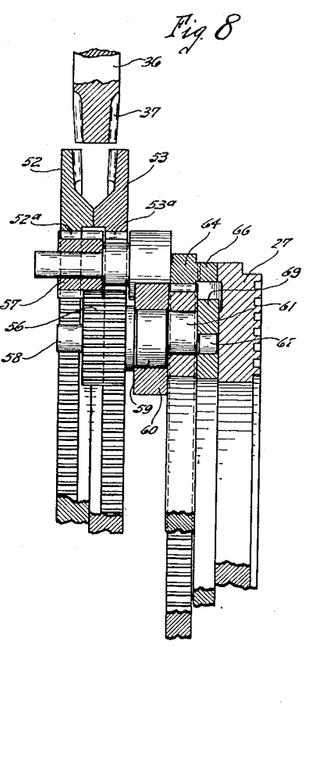
Fig. 8 is a fragmentary sectional view substantially along the irregular line 8—8 of Fig. 7.

It was previously stated that when the motor is slid toward the chuck the pinion 37 slides into meshing engagement with two bevel gears. These bevel gears, which are designated 52 and 53, are similar to each other in all respects and are simultaneously rotated by the pinion 37 but in opposite directions. The lateral thrust of the two gears is taken by hardened buttons 54 which are circumferentially spaced, as indicated by dotted lines in Fig. 7, two being shown in full lines at the lower left-hand side of Fig. 3. One set of these buttons is carried by the rear portion 24 of the chuck body while the other set of buttons is carried by a plate 55 which is secured to the rear side of the rear portion 24 of the chuck. The two bevel gears 52 and 53 have spur teeth cut on their inner peripheries forming internal spur gears 52a and 53a. These gears are rotatably supported on a portion of the rear section 24 of the chuck body as shown at the left-hand lower corner of Fig. 3. Obviously, the two bevel gears 52 and 53 are rotated in opposite directions but both are instrumental in rotating a series of pinions 56 which are equally spaced circumferentially of the chuck, as best shown in Fig. 7, and are supported in portions of the rear section 24 of the chuck body. One of the gears 53a engages and transmits rotary movement directly to the pinions 56. The other gear 52a indirectly rotates the pinions 56 through idler gears 57 best shown in Fig. 8. The pinions 56 are wide-faced pinions and the internal teeth which form the spur gear 53a engage the widefaced teeth of the pinions and the idlers 57 engage the internal teeth which form the spur gear 52a but project over and also engage the teeth of the pinions 56 so that both bevel gears 52 and 53 have equal and simultaneous driving action on the pinions 56 in the same direction. This arrangement is preferred particularly as the two opposite gears 52 and 53 balance the side thrust on the bevel pinion 37 and the motor shaft 36.

Figure 1:
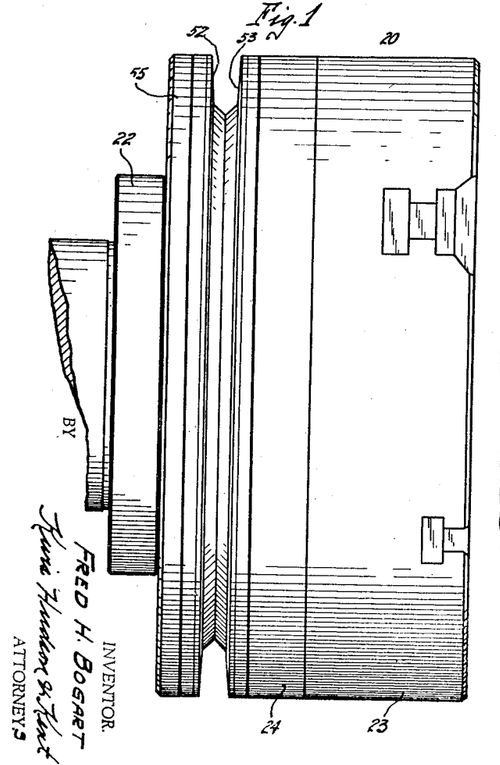
Fig. 1 is a side elevation of the chuck proper.
Figure 2:
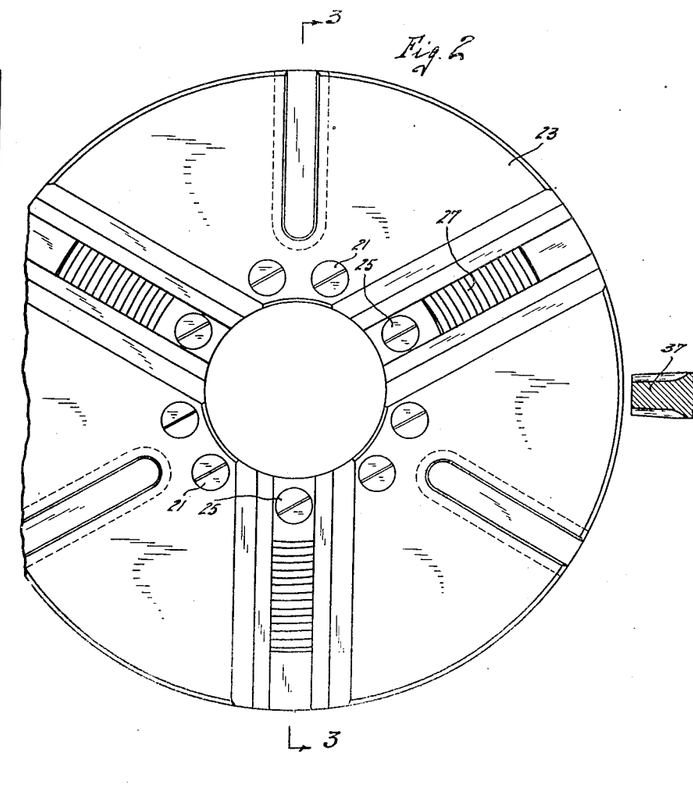
Fig. 2 is a front elevation of the same showing partly in section a motor driven pinion for operating the chuck.
Figure 3:
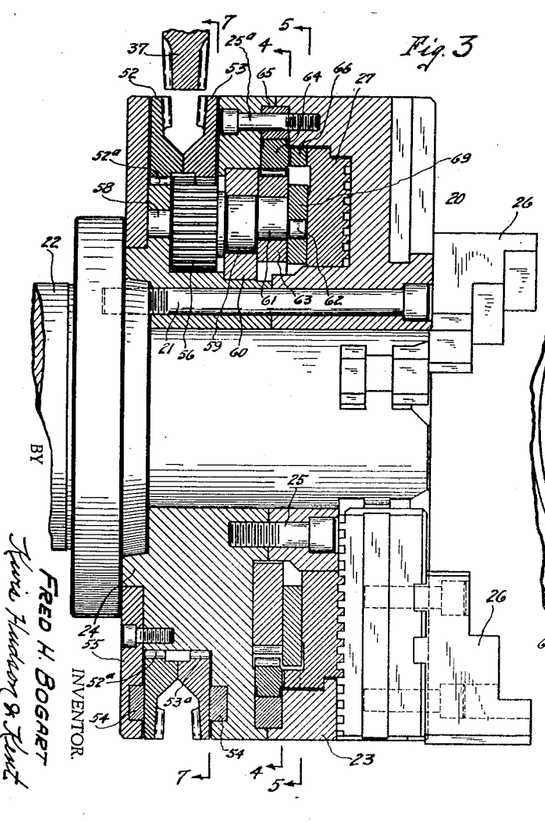
Fig. 3 is a transverse sectional view of the chuck substantially along the line 3—3 of Fig. 2 with the actuating pinion shown partly in section as in Fig. 2.
Figure 4:
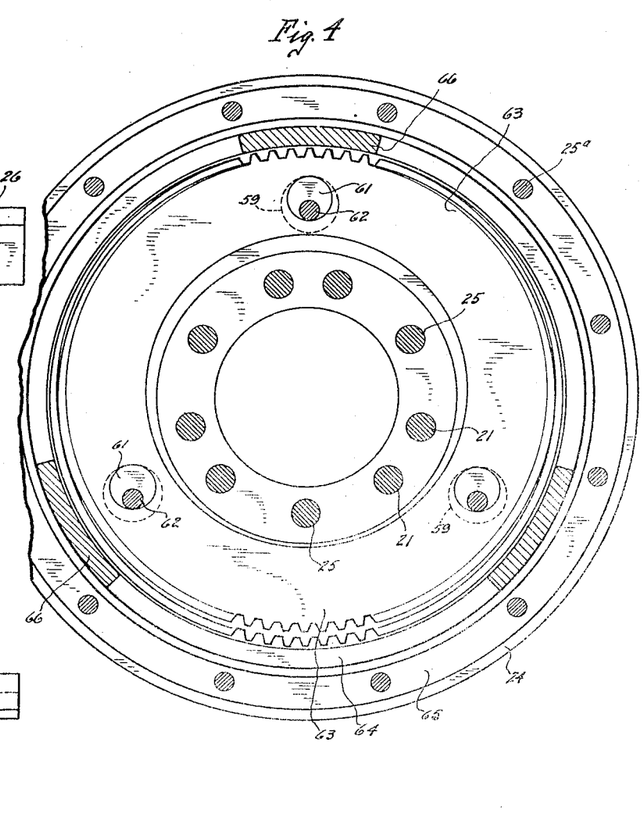
Fig. 4 is a transverse sectional view substantially along the line 4—4 of Fig. 3.
Figure 5:
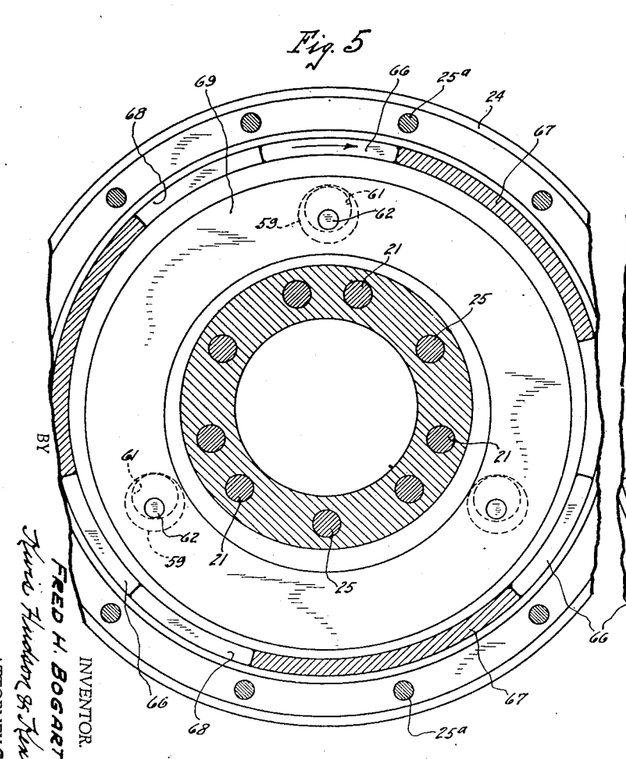
Fig. 5 is a transverse sectional view substantially along the line 5—5 of Fig. 3.
Figure 6:
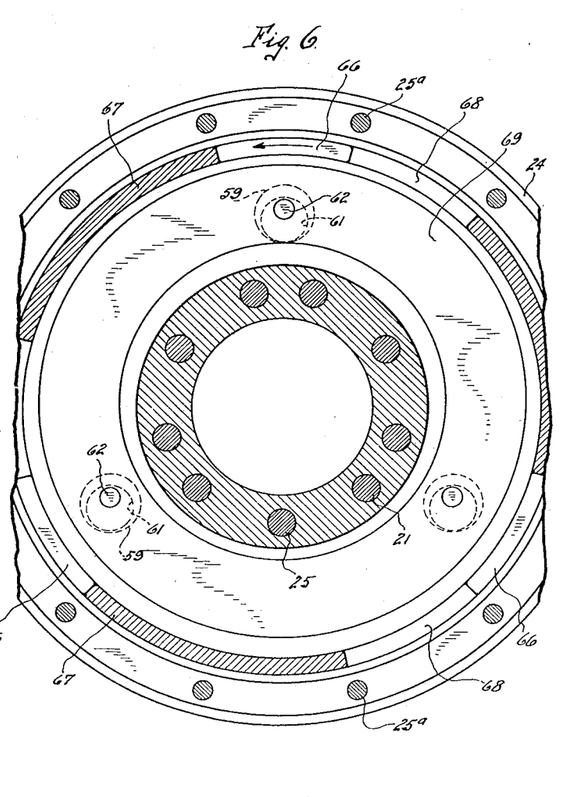
Fig. 6 is a view similar to Fig. 5 but with the parts in a different position than in Fig. 5.

By referring to Fig. 3 it will be noted that the shafts of the pinions 56 have bearings 58 in the rear chuck body section 24 and the opposite portions of the shafts of the pinions 56 have bearings 59 in a hardened sleeve 60 which is supported by the rear section 24 of the chuck body. Just beyond the bearing portions 59 the shafts are formed into eccentrics 61 and beyond the eccentrics 61 into smaller but opposed eccentrics 62. The purpose of the last mentioned eccentrics will be later explained. The eccentrics 61, one being shown in Fig. 3 and three being shown in Fig. 4, are equally spaced circumferentially as illustrated in Fig. 4, and they are similarly arranged with respect to each other so far as their eccentric portions are concerned, or, in other words, have their eccentric portions all in the same direction.

These eccentrics 61 are instrumental in causing a slow relative rotary motion between two gears one of which has an operative connection with the scroll 27 so as to impart to it a slow rotary movement and thus impart to the jaws a powerful gripping action on the work piece. In this instance I employ in association with the eccentrics 61 a gyrating or wobbling gear. This gear, which is designated 63, is in the form of a ring or annulus which is supported on the eccentrics, the gear having openings in which the eccentric portions project and rotate with a close fit and which constitute bearings for the gear. This gear 63 has at its outer periphery spur gear teeth, and it is arranged inside of but eccentric with respect to a companion gear 64 which is arranged coaxially of the chuck body and is freely rotatable therein being supported by a hardened steel ring 65 which is supported between the two sections of the chuck body and constitutes a pilot therefor. This gear 64 has spur teeth on its inner periphery and a portion of which teeth are at all times in meshing engagement with a portion of the teeth of the gyrating or wobbling gear 63. By the simultaneous rotation of the eccentrics 61 operating in the openings formed in the gear 63, a gyratory or so-called wobbling action is imparted to the gear 63 in one direction or the other depending upon the direction of rotation of the eccentrics 61 but without imparting rotation to the gear 63. Thus the gear 63 is given a bodily gyratory or so-called wobbling action without being rotated and always with a portion of its teeth in mesh with a portion of the teeth of the outer gear 64. The latter has a few more teeth in its inner periphery than the gear 63 has on its outer periphery and, in consequence, as the gear 63 is given its wobbling or gyratory action, in one complete rotation of the eccentric 61 the outer gear 64 is given a rotary movement equal to the difference between the number of teeth of the two gears. The difference in the number of teeth in the two gears (which may be one or more than one) will determine the extent of rotary movement or the fraction of a revolution of the gear 64 by each rotation of the eccentrics 61.

The rotation of the gear 64 imparts rotary movement to the scroll, but preferably a lost motion connection is provided between the gear and the scroll so that a hammer blow will be imparted to the scroll, this being desirable when the jaws are to be released from gripping relation with the work piece. To accomplish this result, i. e., to rotate the scroll and to impart a hammer blow at the start of the rotative movement of the scroll, I provide on the side of the gear 64 a series of equally spaced segmental tongues 66 and I form on the adjacent side of the scroll a series of equally spaced tongues 67 forming slots 68 into which the tongues 66 project. The slots 68 are of greater circumferential length than the tongues 66 so that when rotation is imparted to the gear 64 the tongues 66 will not impart a rotary motion to the scroll until the ends of the tongues reach the ends of the slots 68 and abut against the tongues 67 of the scroll. The idle movement of the gear 64 and of course of the tongues 66 before the tongues 66 engage the tongues 67 of the scroll allows the gear 64 to reach its maximum speed, and when the engagement between the tongues takes place a hammer blow is imparted to the scroll, this blow usually being sufficient to release the jaws from the work piece regardless of the severe gripping relation of the jaws on the work piece.

In the event the jaws of the chuck are not released by a single hammer blow as described above, the motor may be momentarily reversed by depressing one of the push buttons 51 of the switch 50 and then again reversed by depressing another of the push buttons so as to again rotate the motor in the first direction. This results in a second hammer blow being imparted to the scroll and generally this will be sufficient to release the jaws if they were not released by the first hammer blow. This same procedure may be followed regardless of whether the jaws are to be released from external or internal gripping relation with the work piece. If desired, a hammer blow, or a series of hammer blows for that matter, may be given to the scroll to insure an exceedingly tight gripping action of the jaws on the work piece.

When the operator desires to actuate the work gripping means to cause the same to either grip or release a work piece, he will pull the rod 38 forwardly until the motor 28 and the slide 29 are moved their full distance toward the chuck or until the pinion 37 is in full meshing engagement with the bevel gears 52 and 53 at which time the slide 29 abuts with the stop 32. He will then start the motor in one direction or the other by depressing the appropriate push button 51. This will cause both of the bevel gears 52 and 53 to rotate the pinions 56 and therefore the eccentrics 61, thus causing a slow rotative movement to be imparted to the outer gear 64, as fully explained above, and consequent slow rotative movement to be imparted to the scroll 27. The lost motion connection between the gear 64 and the scroll 27 is particularly useful as above stated when the jaws are being released from a work piece. By this mechanism the high gear reduction between the driving pinion 37 and the scroll and the consequent high leverage action on the scroll and by the latter on the jaws result in exceedingly powerful gripping action of the jaws on the work piece and a powerful force applied to the jaws to release them from the work piece.

The unbalanced relation due to the eccentricity of the gear 63 to the axis of the chuck body is overcome or balanced in accordance with the present invention by a balancing weight or disk 69 which is supported on the eccentrics 62 which are eccentrically disposed in the opposite direction with respect to the eccentrics 61. Accordingly, the eccentric movement of the balancing weight 69 will always be in the opposite direction to that of the gyrating or wobbling gear 63 and a substantial balance will be obtained at all times, this being of considerable importance when the chuck body is being rotated at high speed.

Reference will now be had to the construction illustrated in Figs. 13 to 19 inclusive wherein I show a chuck having an operating motor incorporated in the chuck body rather than being located externally of the chuck body as in the construction first described. In the form of the chuck illustrated in these figures, the chuck has, as before, a body composed of a front portion 70 and a rear portion 71 which are secured together by bolts 72, this chuck body being secured to the rotating spindle 73 by bolts 74 which cooperate with the bolts 72 in holding the front and rear portions of the chuck body together. At the front of the chuck body are reversible type jaws 75 which move inwardly and outwardly in radial slots and are actuated by a rotatable scroll 76 in threaded relation with the rear faces of the jaws and corresponding to the scroll of the construction first described.

Figure 15:
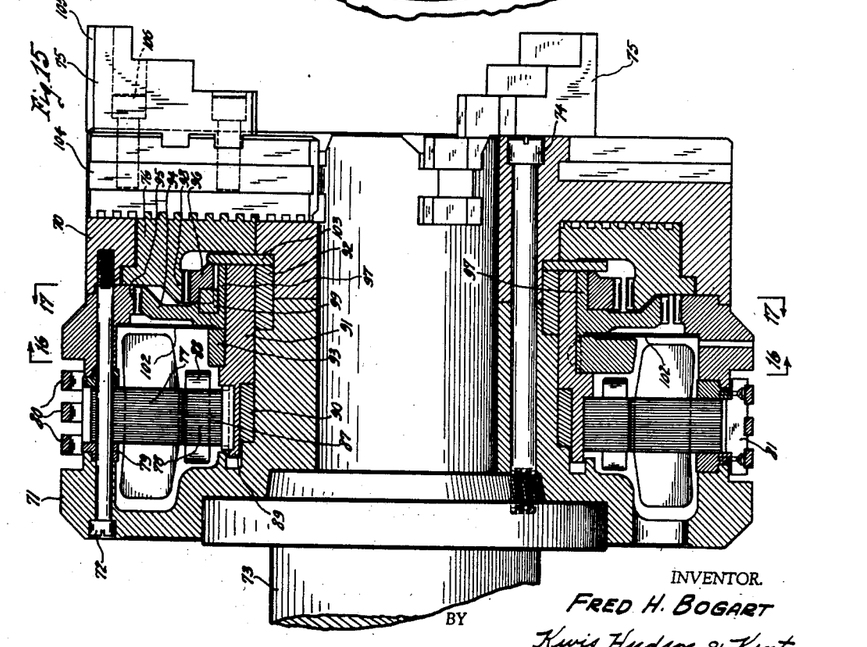
Fig. 15 is a transverse sectional view substantially along the line 15—15 of Fig. 14.
Figure 16:
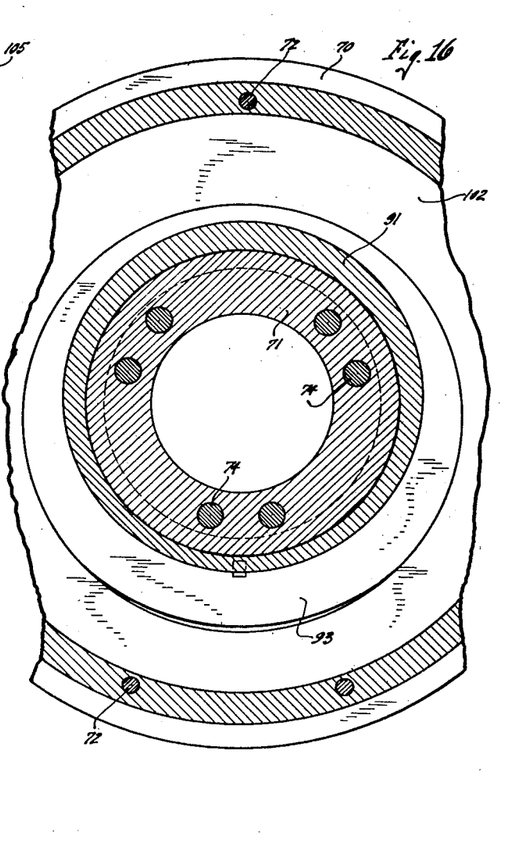
Fig. 16 is a transverse sectional view along the line 16—16 of Fig. 15.
Figure 17:
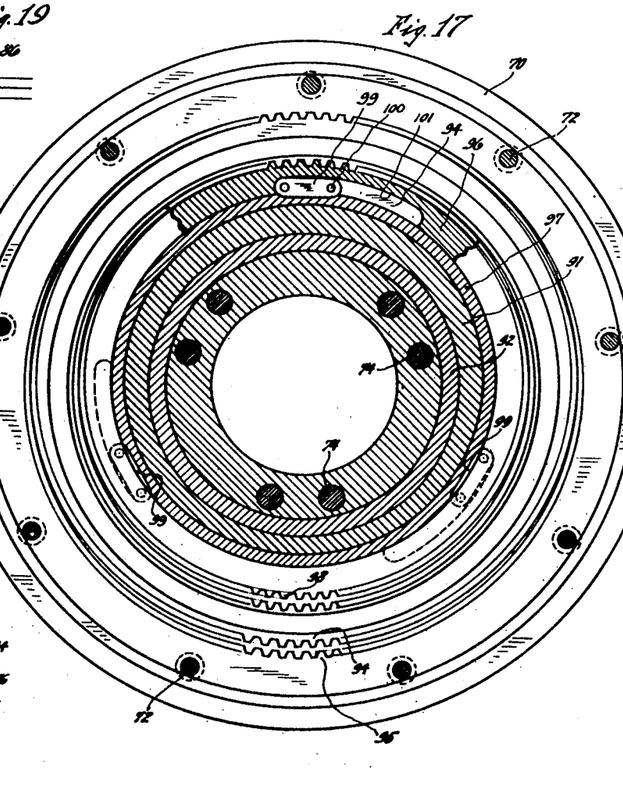
Fig. 17 is a transverse sectional view along the line 17—17 of Fig. 16.
Figure 18:
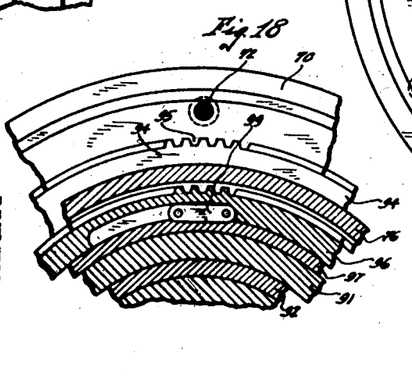
Fig. 18 is a fragmentary sectional view of a portion of Fig. 17 but with the parts in a different position than shown in Fig. 17.
Figure 19:
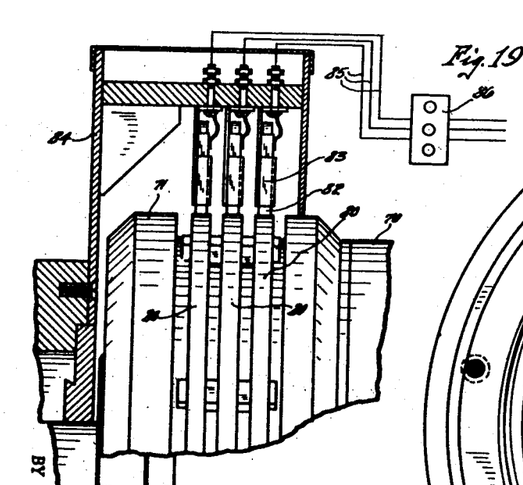
Fig. 19 is a view partly in section and partly in elevation showing a portion of the chuck illustrated in Fig. 13 and some of the electrical contacts employed in the electric motor circuit and also showing in section the support for the contacts.

The operating motor herein illustrated and carried by the chuck body as stated above includes a stator 77 and a rotor 78. While the details of the motor are not material to the present invention, it might be stated that a motor of the induction type is preferred, this being generally a three-phase motor as before. The stator 77 includes a laminated body which may carry a winding with the laminae held together between two pilot washers 79 which are clamped together between the front and rear portions of the chuck body by the bolts 72. Current is carried to the three-phase winding of the stator through the medium of slip rings 80 which are mounted on a series of circumferentially spaced insulating strips 81 which, as indicated in Fig. 15, are secured to the pilot rings 79. These rings are engaged by suitable brushes 82 carried in brush holders 83 carried by a support 84 attached to the head-stock of the lathe or other machine tool of which the spindle is a part. The brushes 82 are aligned with and may at all times engage the rings 80. Current will be supplied to these brushes by conductors 85 in which is provided a switch 86 which may be similar to the switch of the construction first described and which will be located on the machine in convenient reach of the operator when he is standing in front of the machine and will control the forward and reverse rotations of the motor.

The rotor 78 includes a laminated core 87 and may have a winding 88 the core being keyed to a sleeve 89 the radial thrust of which is taken by a hardened ring 90 which is secured to the rear portion 71 of the chuck body. The sleeve 89 projects forwardly beyond the rotor of the motor and this has an eccentric portion 91 as clearly shown in Fig. 15. Beneath this eccentric portion is another hardened steel ring 92 to take the radial thrust of this portion of the sleeve. Keyed or otherwise secured to the eccentric portion 91 of the sleeve 89 is a balancing disk 93 which is an eccentric member the eccentric portion being disposed in the opposite direction from the eccentric portion 91 of the sleeve 89. Thus the eccentricity of the eccentric portion 91 of the sleeve 89 will be counterbalanced so as to provide for smooth high speed rotation of the chuck.

Rotatably mounted on the eccentric portion 91 of the sleeve 89 is a gear 94 which is in meshing relation with a relatively fixed gear 95 which is carried by the forward portion 70 of the chuck body concentric with the axis thereof. This gear 95 is arranged outwardly of the gear 94 and the number of teeth of this gear is one or more greater than the number of teeth of gear 94. The teeth of gear 95 are formed on its inner periphery and several of the teeth of this gear are always in mesh with several of the externally formed teeth of the eccentrically mounted gear 94. It will be apparent that the gear 94 has gyratory action with respect to the gear 95 and at each rotation of the eccentric 91 the gear 94 is given rotative movement equivalent to the difference in the number of teeth in the gears 94 and 95. It will be noted that in this instance the inner gear 94 is given a rotative movement whereas in the construction first described the outer gear is given a rotative movement by a non-rotating wobbling inner gear. While the inner gear in this instance has a gyratory or wobbling action akin to that imparted to the non-rotating wobble gear of the construction first described, technically, the movement of the gear 94 may be said to be an epicyclic movement.

The rotary movement of the gear 94 is transmitted to an externally toothed gear 96 adjacent to it. This gear rides on the surface of a sleeve-like portion 97 of the gear 94. This gear 96 in turn meshes with an internally toothed gear 98 formed on a portion of the scroll. Thus the slow rotation of a few degrees imparted to the gear 94 at each rotation of the eccentric 91 is transmitted to the gear 96 and this causes the slow rotation of the scroll which as before actuates the jaws with a force having a very high leverage action with respect to the rapidly rotating motor-driven eccentric 91.

While the rotative movement of gear 94 is imparted to gear 96, there is a lost motion connection between the two by which a hammer blow will be imparted to the gear 96 and therefore to the gear 98 and the scroll 76. This is accomplished by securing to recessed portions of the gear 94 a series of circumferentially spaced driving dogs 99 which may be secured to the gear 94 by pins 100 or otherwise and which extend into segment-shaped slots 101 formed in the adjacent face of the gear 96. Thus while the dogs 99 are traveling lengthwise through the slots 101 no motion will be transmitted to the gear 96 until the forward ends of the dogs reach the ends of the grooves 101 with the advantages and for the purpose mentioned above and explained in connection with the construction first described.

As it may be desired to provide lubricant for the gears 94, 95, 96, and 98, these gears are enclosed in the equivalent of a chamber which is separated from the motor by a shield 102. The lateral thrust on the scroll 76 is taken by a hardened steel thrust washer 103 which engages also the gear 96 and keeps it in proper position with respect to the gears 94 and 98.

The term "jaw" as used in the description of both constructions herein illustrated applies to composite jaws consisting of slides 104 which may be I-shaped in cross-section, as is customary in the art, and detachable portions 105 which are here shown as secured to the slides by screws 106. In this instance, the detachable parts 105 are arranged for external gripping, but their positions may be reversed for internal gripping, as is well known.

Thus it will be seen that I have illustrated and described two forms of my invention, one including an external motor and the other an internal motor, and that in both instances the motors each drive at least one eccentric. It will be seen also that in both instances the eccentric or eccentrics impart a wobbling action to a gear which in one case is held against rotating movement relative to the gear with which it is in meshing relation and which in the other instance is rotated relative to a non-rotating gear with which it is in meshing relation. It will be seen further that in both instances the wobbling gear forms one element of high reduction gearing between the eccentric or eccentrics and the scroll so as to transmit to the latter and therefore to the chuck jaws a force having a very high leverage action with respect to the power-driven eccentric or eccentrics. Likewise it will be seen that in both instances the force is applied through a lost motion connection by which a hammer blow may be imparted to the scroll.

While I have shown different embodiments of my invention, I do not desire to be confined to the same as changes may be made in the details of construction and in the arrangement of parts without departing from the spirit and scope of my invention, and I therefore aim in my claims to cover all modifications which do not involve a departure from the spirit and scope of my invention in its broadest aspects.

Having thus described my invention, I claim:

1. In a work gripping device, work gripping means, means for causing the latter to have a gripping action on the work and including a pair of meshing gears one arranged inside the other and having a relatively small difference in number of teeth, one of the gears being operatively connected to the work gripping means, means including an eccentric arranged in an eccentric opening in the other of said gears for giving the same bodily non-rotative movement within the first named gear, a shaft carrying said eccentric and a driving pinion, power driven means for rotating said pinion, said power driven means including a pair of bevel gears, a motor driven bevel pinion adapted to be inserted between and to rotate said bevel gears in opposite directions, and means whereby both of said bevel gears impart rotative movement to said first named pinion in either forward or reverse directions.

2. In a chuck, a chuck body movably supporting work gripping means, a member in said body operatively connected with said means for actuating the same, an internal gear rotatable in said body, cooperating portions on said member and said gear providing a lost motion tongue and slot driving connection therebetween, a plurality of shafts rotatably mounted in said body and each provided with an eccentric portion, an external ring gear located within and meshing with said internal gear and provided with openings in which said eccentric portions of said shafts are located, wherefore rotation of said shafts imparts a non-rotating gyratory movement to said ring gear to rotate said internal gear and move said member, a power source, and means operatively connecting said power source to all of said shafts.

3. In a chuck, a chuck body movably supporting work gripping means, a member in said body operatively connected with said means for actuating the same, an internal gear rotatable in said body, operative connections between said gear and said member, a plurality of shafts rotatably mounted in said body and each provided with an eccentric portion, an external ring gear located within and meshing with said internal gear and provided with openings in which said eccentric portions of said shafts are located, wherefore rotation of said shafts imparts non-rotative gyratory movement to said ring gear to move said internal gear and said member, said shafts being provided with second eccentric portions oppositely disposed with respect to said first mentioned eccentric portions, and a counterweight ring provided with openings in which said second named eccentric portions of said shafts are located.

4. In a chuck, a chuck body movably supporting work gripping means, a member in said body operatively connected with said means for actuating the same, an internal gear rotatable in said body, operative connections between said member and said internal gear, a plurality of shafts rotatably mounted in said body and each provided with an eccentric portion, an external ring gear located within and meshing with said internal gear and provided with openings in which said eccentric portions of said shafts are located, wherefore rotation of said shafts imparts a non-rotative gyratory movement to said ring gear to move said internal gear and said member, said shafts being provided with second eccentric portions oppositely disposed with respect to said first named eccentric portions and with pinions, a counterweight ring having openings therein in which said second eccentric portions are located, and gear means operatively associated with all of said pinions for simultaneously rotating said shafts.

5. In a chuck, a chuck body movably supporting work gripping means, means for actuating said work gripping means and including a plurality of shafts rotatably mounted in said body and each provided with a pinion, a pair of bevel gears rotatably mounted in said body and facing toward each other, said bevel gears being provided with central openings the peripheries of which are in the form of internal gears, the internal gear of one of said bevel gears meshing with all of said pinions, a second shaft rotatably mounted in said body parallel to and adjacent each of said first mentioned shafts, a wide faced gear on each of said second named shafts and meshing with the internal gear of the other of said bevel gears and with the adjacent pinion, wherefore when a common gear element is rotating in mesh with said bevel gears the latter each drives all of said pinions.

6. A chuck comprising a body adapted to be secured to a support such as a spindle, gripping jaws movably carried by said chuck body, means carried by said chuck body for moving said jaws, and means carried by said chuck body for actuating said first means and comprising an internal ring gear rotatably supported in said chuck body and operatively connected with said first named means, an external gear mounted in said chuck body within said ring gear and having fewer teeth than said ring gear and meshing with the latter and provided with a plurality of spaced openings, a plurality of rotatable shafts carried by said chuck body and provided with eccentric portions located in said openings, and means carried by said chuck body for simultaneously rotating said shafts wherefore said external gear will be given a wobbling non-rotative movement by said eccentric portions and will cause a slow rotative movement of said internal gear to effect movement of said first named means and said jaws.

7. A chuck comprising a body adapted to be secured to a support such as a spindle, radially movable gripping jaws carried by said chuck body, a scroll carried by said chuck body for moving said jaws, and means carried by said chuck body for actuating said scroll and comprising an internal ring gear rotatably supported in said chuck body and operatively connected with said scroll, an external gear mounted in said chuck body within said ring gear and having fewer teeth than said ring gear and meshing with the latter and provided with a plurality of spaced openings, a plurality of rotatable shafts carried by said chuck body and provided with eccentric portions located in said openings, and means carried by said chuck body for simultaneously rotating said shafts, wherefore said external gear will be given a wobbling non-rotative movement by said eccentric portions and will cause a slow rotative movement of said internal gear to effect movement of said scroll and said jaws.

FRED H. BOGART.